Figures 1, 2:
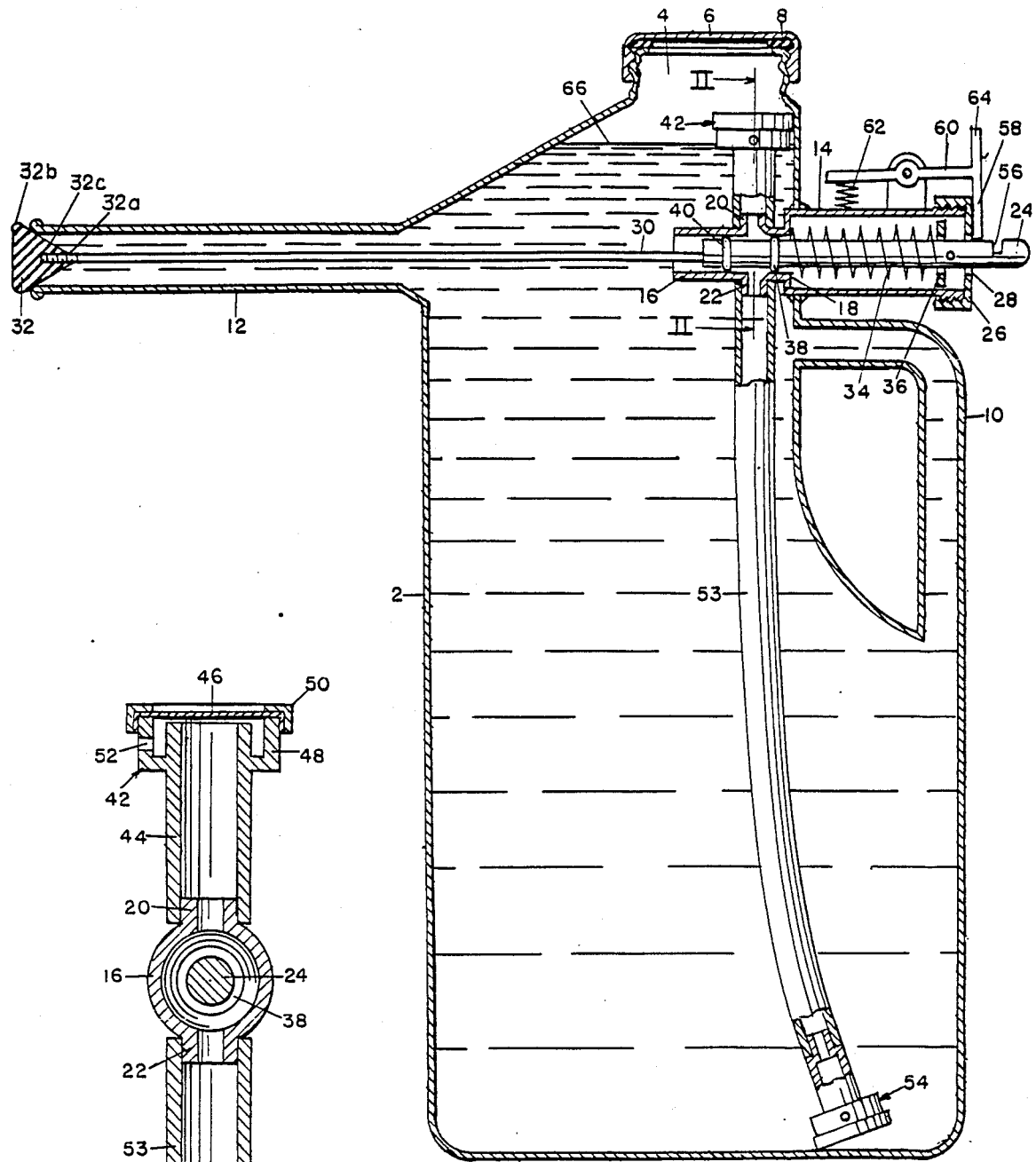

United States Patent [19]

Messner

[11] Patent Number: 4,834,270

[45] Date of Patent: May 30, 1989

[54] GASOLINE CONTAINER

[76] Inventor: Marvin M. Messner, P.O. Box 137, Gentry, Mo. 64453

[21] Appl. No.: 179,854

[22] Filed: Apr. 11, 1988

Related U.S. Application Data

[63] Continuation-in-part of Ser. No. 9,874, Feb. 2, 1987, Pat. No. 4,746,036.

[51] Int. Cl.4 .............................................. B67D 3/00
[52] U.S. Cl. .................................... 222/484; 222/510
[58] Field of Search ............... 222/510, 518, 529, 484

[56] References Cited

U.S. PATENT DOCUMENTS

| | | | |
|---|---|---|---|
| 479,217 | 7/1892 | Kaplan | 222/510 |
| 756,373 | 4/1904 | Joyce | 222/510 |
| 1,083,532 | 1/1914 | Grayham | 222/518 |
| 1,220,929 | 3/1917 | Baltzley | 222/510 |
| 2,319,517 | 5/1943 | Rand | 222/510 |
| 2,570,422 | 10/1951 | Bashore | 222/510 |
| 2,606,699 | 8/1952 | Andricks | 222/510 |

FOREIGN PATENT DOCUMENTS

| | | | |
|---|---|---|---|
| 3255 | of 1890 | United Kingdom | 222/510 |
| 15579 | of 1892 | United Kingdom | 222/510 |

*Primary Examiner*—Andres Kashnikow
*Assistant Examiner*—Michael J. Forman
*Attorney, Agent, or Firm*—Hovey, Williams, Timmons & Collins

[57] ABSTRACT

A container for gasoline or other liquids is provided which includes a hollow body having an outwardly directed pouring spout, but otherwise sealed so as to permit inversion thereof, a main valve closing the outer end of the spout, a remotely disposed operating stem manually operable to open said main valve, and an air admission system operable to deliver air from outside the container body. The main valve is in the form of a conical plug having a smooth surface, whereby liquid is poured from the spout in a laminar, hollow cylindrical flow pattern. The hollow cylindrical flow pattern pours easily from the spout without splashing while enabling the user to view the surface of the liquid within a gasoline tank or other receptacle into which the liquid is poured.

4 Claims, 1 Drawing Sheet

GASOLINE CONTAINER

CROSS-REFERENCE TO CO-PENDING APPLICATION

This application is a continuation-in-part of application Ser. No. 07/009,874 filed Feb. 2, 1987, now U.S. Pat. No. 4,746,036, issued May 24, 1988.

This invention relates to new and useful improvements in containers for gasoline or other liquids to be dispensed by pouring from a spout of the container.

An important object of the present invention is the provision of a container of the character described which is normally sealed against the escape of the contained liquid regardless of the position in which said container may be held or disposed.

Another object is the provision of a container of the character described in which a valve sealing the pouring spout thereof is operable by manual means disposed remotely from said spout, in order that there will be no danger of the liquid reaching the fingers or hands of the users.

A further object is the provision of a container of the character described having means for admitting air to the container above the liquid level therein, in order that liquid will pour evenly and smoothly from the spout, without bubbling or gurgling, regardless of the position in which the container may be held during dispensation of the liquid.

A still further object is the provision of a container of the character described having automatically engageable, manually releasable means for latching the pouring spout open whenever it has been manually opened, in order that pouring may continue as long as may be desired with no requirement that the user hold the spout sealing means open by continuous pressure on any releasing means.

Other objects are safety, ease and convenience of use and operation, and simplicity and economy of construction.

With these objects in view, as well as other objects which will appear in the course of the specification, reference will be had to the accompanying drawing, wherein:

FIG. 1 is a vertical sectional view of a gasoline container embodying the present invention, with certain parts partially broken away and shown in section, and FIG. 2 is an enlarged, fragmentary sectional view taken on line II—II of FIG. 1.

Like reference numerals apply to similar parts throughout the drawing, and the numeral 2 applies to the hollow body of the container forming the subject matter of the present invention. Said body is formed of any suitable material, such as metal or plastic of a type impervious to gasoline, and may have any desired cross-sectional contour, such as cylindrical or square. It is provided at its top with a filling neck 4 releasably closed by a threaded cap 6 and sealed by a gasket 8 interposed between said neck and said cap. As shown, it is provided with an integral handle portion 10, by means of which it may be lifted and carried. Adjacent its upper end, it is provided with a tubular pouring spout 12 extending horizontally outwardly therefrom to any desired length, and interconnected into the interior thereof. A cylindrical tube 14 is sealed into a wall of the body opposite from spout 12, so as to be coaxial with said spout. Said tube projects outwardly from the body, but is provided at its inner end with a coaxial extension of reduced diameter, the reduction of diameter providing an outwardly facing shoulder 18. The extension 16 is provided with an upwardly extending tubular neck 20 and a downwardly extending neck 22. An elongated stem 24 extends axially through tube 14, projecting at its outward end through a threaded cap 26 closing the outward end of the tube, the hole 28 of the cap through which the stem extends being sufficiently large to admit air to the tube, and projects inwardly to extend through portions of tube extension 16 at both sides of necks 20 and 22. Affixed coaxially to the inner end of stem 24 is a thin rod 30 which extends across the container body and through spout 12, being affixed at its extended end into the apex of a conical valve plug 32 disposed at the outer end of said spout, said spout being formed of an elastomeric material. The outer end of said valve plug is of too large diameter to enter the spout. Stem 24 is biased outwardly, or to the right as viewed in FIG. 1, by a coil spring 34 disposed thereabout within tube 14 and being compressed between shoulder 18 and a washer 36 essentially fixed on the stem. Said spring urges valve plug 32 into the outer end of spout 12 to close said spout, while inward manual pressure on the outer end of said stem will open said valve plug to permit the outward flow of liquid from the container. Rod 30 is sufficiently slim and flexible to render the valve plug self-centering relative to the outer end of the spout, so that closure of the valve will be accurate and complete.

Stem 24 is provided within the length of tube extension 16 with a pair of spaced apart O-rings 38 and 40. When valve plug 32 is closed, O-ring 38 is disposed between necks 20 and 22, and the larger tube 14, whereby to form a seal preventing the passage of air from tube 14 to the necks. O-ring 40 seals the portion of tube extension 16 at the opposite side of the necks at all times, whereby to prevent the flow of liquid from the container body into the tube extension.

A diaphragm valve indicated generally by the numeral 42 is connected to upwardly extending neck 20, and as shown in detail in FIG. 2, said valve includes a tubular stem 44 sealed at its lower end about said neck, projecting upwardly to a position just below cap 6, and being open at its upper end. A very thin, elastomeric diaphragm 46 covers the open upper end of the stem in very closely spaced relation thereto, said diaphragm being sealed to the upper end of a cup-like enlargement 48 of said stem by a cap member 50. A hole 52 formed in said enlargement opens beneath the diaphragm, but not into the stem itself. A flexible hose 53 is sealed about downwardly extending neck 22, and projects substantially to the bottom of container body 2, having a diaphragm valve 54 mounted in its lower end. Valve 54 is similar in all respects to valve 42, except that it is relatively inverted as compared to the latter.

Stem 24 has a notch 56 formed in the portion thereof projecting outwardly from cap 26. When said stem is pressed inwardly to open valve 32, as previously described, said notch is engaged by the toe 58 of a latch lever 60 pivoted to the outer surface of tube 14, whereby to secure valve 32 in the open position. Said lever is biased to engage notch 56 by a spring 62. Lever 60 is also provided with a thumb-piece 64 which when pressed to the left as viewed in FIG. 1 will elevate the latch toe 58 out of engagement with notch 56, and valve 32 will be closed by spring 34. Both the outer end of stem 24, and the thumb-piece 64 of the latch lever, may be conveniently engaged and pressed by the thumb of the hand the user employs to hold handle 10 to carry and support the container. It will be readily apparent that all elements of the device which are exposed to the liquid contents of the container must be of a type impervious to gasoline, if the container is in fact used to carry gasoline, although said container obviously has general utility. For example, valve plug 32, gasket 8, O-rings 38 and 40, hose 53 and diaphragms 46 of valves 42 and 54 may be formed of neoprene, which is elastically rubberlike in characteristics, but is impervious to attack or deterioration by gasoline.

In operation, it will be seen that when the container has been filled to the level indicted at line 66 in FIG. 1, valve 32 will be closed, cap 6 will be sealed by gasket 8, O-ring 38 will be sealed in the portion of tube extension 16 to the right of necks 20 and 22, O-ring 40 will be sealed in the portion of extension tube 16 to the left of said necks, diaphragm valve 54 will be closed to prevent the entry of gasoline into hose 53, and diaphragm valve 42 will be open. Thus the container is completely seled against the escape of gasoline. If it is then desired to pour gasoline from the container while said container is in any approximately upright position, stem 24 is pressed inwardly. This opens valve 32, so that gasoline may pour from spout 12. It also moves O-ring 38 to the left sufficiently to allow O-ring 38 to open an air passage from tube 14 to neck 20, so that atmospheric air entering said tube through hole 28 of cap 26 may flow upwardly through stem 44 of diaphragm valve 42, and pass under diaphragm 46 and outwardly through hole 52 to enter the container body above liquid level 66. Since the air pressure within and outside of the container body are thus equalized, the gasoline may flow from spout 12 freely and smoothly, without bubbling or gurgling, and may thus be directed into the filling neck of an automobile gasoline tank or other receptacle without splashing. This would obviously not be the case if the evacuation of gasoline from the container created a vacuum within the container, and said vacuum had to be periodically relieved by air bubbles entering the discharge end of the spout. The container body should preferably never be filled to any level above the level 66 indicated in FIG. 1. The inward movement of stem 24 also causes latch toe 58 to engage in notch 56, whereby to secure valve 32 open as long as may be desired without necessity of requiring the operator to maintain constant pressure on said stem. However, the valve may be closed at any time by pressing latch thumb piece 64 to the left, as viewed, to lift toe 58 from notch 56, so that spring 34 draws valve 32 into the mouth of the spout. As previously mentioned, the flexibility of rod 30 permits valve 32 to center itself and seat accurately in the mouth of the spout.

In some circumstances it may be necessary to invert the container body in order to position substantially the entire container body 2 above the level of spout 12 to allow substantially the entire contents of the container to flow outwardly through said spout. This may be necessary, for example, if the spout is to be inserted into the filling neck of an automobile gasoline tank, and said neck is disposed horizontally or is inclined only slightly downwardly from its open end. When the container is inverted, valve 42 is immediately closed by the liquid pressure then exerted on its diaphragm 46, and valve 54 is immediately opened by the cessation of liquid pressure on its diaphragm. Air from tube 14 may then flow upwardly through valve 54 to provide atmospheric pressure above the liquid level, and the gasoline may continue to flow smoothly and evenly from spout 12. All other valves and functions continue to function in the same manner as before, whether the container is upright or inverted.

Inasmuch as the spout 12 is formed of an elastomeric material, the spout 12 may be bent or turned to accommodate a specific type of receptacle, such as an automobile or lawn mower gas tank. Because rod 30 is sufficiently thin and flexible, it may conform to any desired shape of the spout 12 yet render valve plug self-centering relative to the outer end of the spout 12.

As the conical plug 32 is pushed outwardly by the rod 30, the gasoline or other fluid carried within the container is discharged from the outer end of the spout. The conical plug is tapered outwardly from its apex 32a to its outer end 32b. The plug is further provided with a smooth, uninterrupted surface 32c interconnecting the apex 32a and the outer end 32b. Liquid discharged from the spout 12 when plug 32 is opened thereby flows between surface 32c and the outer end of the spout 12 in a laminar, hollow cylindrical pattern. This hollow, cylindrical flow pattern is highly desirable in that it permits gasoline or other liquid to leave the spout 12 smoothly and without splashing onto the user or onto nearby objects, but permits the surface of the liquid in a receptacle to be more clearly seen as the hollow cylindrical flow pattern breaks up upon encountering the liquid already in the darkened interior of the receptacle. Spills due to overflow of a receptacle tank are thereby more readily prevented by the hollow cylindrical flow pattern created as a result of the fluid flowing around the conical plug.

While I have shown and described a specific embodiment of my invention, it will be readily apparent that many minor changes of structure and operation could be made without departing from the spirit of the invention.

What I claim as new and desire to protect by Letters Patent is:

1. A liquid dispensing container comprising:
   (a) a hollow, liquid container body having a normally lowermost bottom and a normally uppermost top end;
   (b) an elongated pouring spout having an inner end and an outer end, said spout being interconnected into said body and extending laterally outwardly therefrom, and being vertically spaced from said bottom and more proximate to said top than said bottom;
   (c) a main valve releasably closing the outer end of said spout, said main valve constituting a generally conical plug having an apex end, and an outer end;
   (d) spring means biasing said main valve to a closed position, and wherein said spring means biases said conical plug inwardly into said main spout whereby said main valve is closed at the outer end of said spout; and
   (e) operating means carred by said container body remotely from said spout and being manually operable to overcome said biasing means and to move said main valve to an open position,
   (f) said plug being formed of resiliently compressible material inserted inwardly, apex end first, into the outer end of said spout, said plug being too large at its outer end to enter said spout,
   (g) said plug having a smooth uninterrupted surface interconnecting said apex end and said outer end whereby liquid carried within said body may be discharged from said spout in a laminar, hollow cylindrical flow pattern.

2. A liquid dispensing container comprising:
   (a) a hollow, liquid container body having a normally lowermost bottom and a normally uppermost top end;
   (b) an elongated pouring spout having an inner end and an outer end, said spout being interconnected into said body and extending laterally outwardly therefrom, and being vertically spaced from said bottom and more proximate to said top than said bottom;
   (c) a main valve releasably closing the outer end of said spout, said main valve constituting a generally conical plug having an apex end and an outer end;
   (d) spring means biasing said main valve to a closed position, and wherein said spring means biases said conical plug inwardly into said main spout whereby said main valve is closed at the outer end of said spout; and
   (e) operating means carred by said container body remotely from said spout and being manually operable to overcome said biasing means and to move said main valve to an open position, wherein said operating means includes an elongated, flexible rod extending through said spout and affixed at its outer end to said conical plug, and said spout is formed of an elastomeric material, the flexibility of said rod allowing said plug to center itself within the open end of the spout to seal the spout,
   (f) said plug being formed of resiliently compressible material inserted inwardly, apex end first, into the outer end of said spout, said plug being too large at its outer end to enter said spout,
   (g) said plug having a smooth uninterrupted surface interconnecting said apex end and said outer end whereby liquid carried within said body may be discharged from said spout in a laminar, hollow cylindrical flow pattern.

3. A fluid dispensing container as set forth in claim 2, further comprising sealing means for admitting or preventing the admission of air into said container body from a hole in said container remote from said spout, said operating means operably connected to said main valve and said sealing means for enabling the simultaneous discharge of fluid from said main valve and admission of air into said container body through said hole and sealing means.

4. A liquid dispensing container comprising:
   (a) a hollow, liquid container body having a normally lowermost bottom and a normally uppermost top end;
   (b) an elongated pouring spout having an inner end and an outer end, said spout being integrally formed with said body, interconnected into said body, and extending laterally outwardly therefrom, and being vertically spaced from said bottom and more proximate to said top than said bottom;
   (c) a main valve releasably closing the outer end of said spout, said main valve constituting a generally conical plug having an apex end and an outer end;
   (d) spring means biasing said main valve to a closed position, and wherein said spring means biases said conical plug inwardly into said main spout whereby said main valve is closed at the outer end of said spout; and
   (e) operating means carried by said container body remotely from said spout and being manually operable to overcome said biasing means and to move said main valve to an open position,
   (f) said plug being formed of a resiliently compressible material inserted inwardly, apex end first, into the outer end of said spout, said plug being too large at its outer end to enter said spout,
   (g) said plug having a smooth, uninterrupted surface interconnecting said apex and said outer end whereby liquid carried within said body may be discharged from said spout in a laminar, hollow cylindrical flow pattern.

* * * * *